Figure 1:
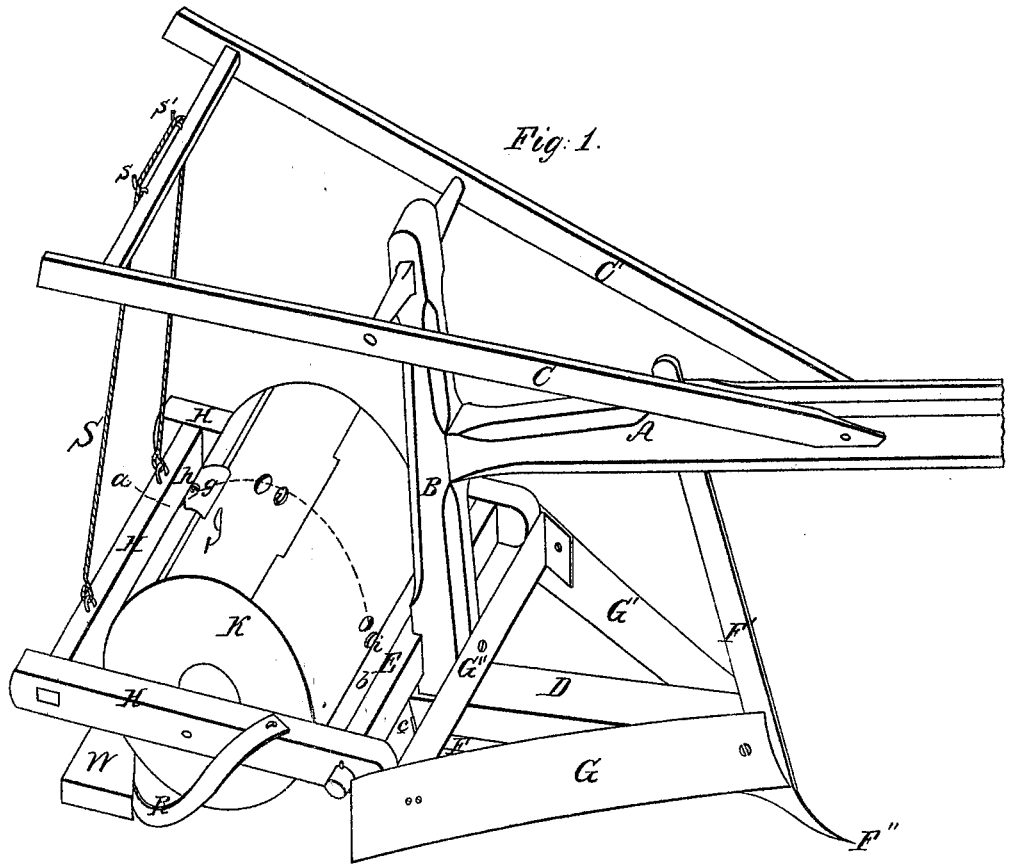

A. W. Brian,
Cotton Planter.
No. 91,206. Patented June 15, 1869.

Witnesses,
A. Barbarin
C. W. Wailey

Inventor;
A. W. Brian
by Rufus R. Rhodes
his attorney

United States Patent Office.

A. W. BRIAN, OF OUACHITA COUNTY, ARKANSAS.

Letters Patent No. 91,206, dated June 15, 1869.

IMPROVEMENT IN COTTON-SEED PLANTER.

The Schedule referred to in these Letters Patent and making part of the same.

*To all whom it may concern:*

Be it known that I, A. W. BRIAN, of Ouachita county, State of Arkansas, have invented a certain new and useful Improvement in Cotton-Seed Planters; and I do hereby declare the following to be a full, clear, and exact description of the same, reference being had to the annexed drawing, making a part of this specification.

My object, in the creation of my invention, has been to produce a machine or implement which will, at one and the same time, as it is drawn through the field, cut a furrow or trench in the ground, cut and scrape away the grass and weeds for a considerable space on each side of said trench, and throw them out of the way; plant the cotton-seed at prescribed and regular intervals, and then cover the same; and My invention, hence, consists of a combination of a peculiarly-formed plow, provided on each of its sides with diverging scraper-wings or blades, with a cylindrical or barrel recipient and seed-planter, and a loose coverer that follows behind the same.

But my invention will be better understood by referring to the drawing, on which—

Figure 2:
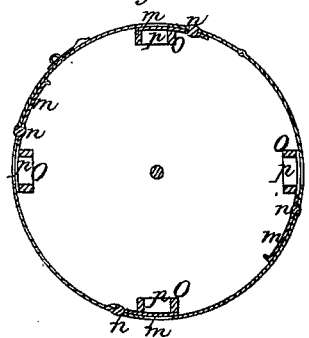

Figure 1 is a perspective view of the same, as when ready for use, a part of the beam being, however, unseen, and a portion of the handles cut off; and Figure 2, a transverse section of the seed-recipient and planter, the bisection being at line $a\ b$ of fig. 1.

I construct a strong frame, consisting of a beam, A, an upright standard, B, handles C C', a piece, D, projecting in front, under and in the line of the beam A, from the lower extremity of the standard B, and a cross-bar, E.

The plow or trench-cutter consists of a bifurcated bar, the two arms or forks of the same being marked, respectively, F F', which terminates in a downwardly-projecting and peculiarly-formed point, F''.

This plow is secured to the frame, as shown on the drawing; that is to say, the upright part F', at its upper end, is secured to the beam A by means of a mortise, into which it is inserted, and therein keyed, and to the bar D, by means of a notch in the front extremity of the latter, into which it is fitted, and in such manner as to bring the part F in close contact with said bar D, on its lower edge, throughout its whole length.

The rear extremity of the part F is turned up, as shown at $c$, and secured, by means of a bolt, to the rear end of said bar.

It will be observed that the bar D, although very much wider at or on its top, is of the same width as the part F, where they come together, and that hence the two together present the form of a triangle.

This formation secures a sufficient width of trench to prevent the deposition of seed outside the same, and, at the same time, a sufficient packing of the earth to keep the trench from filling up, until the seed has been put into it.

The diverging scraper-blades G G' are secured in the position shown, by means of the transverse bar G'', which is connected or fastened to the standard B, by means of a screw-bolt, and bolts at their front ends, which take into the bar D, as shown at $d$.

The divergence of these scraper-blades G G' may be greater or less than as shown on the drawing, as circumstances may require.

The blades G G' are so formed as to cut the grass and weeds from their front to their rear ends, and to serve as mould-boards, to throw off everything cut, out of the line of their path.

Pivoted to the cross-bar E, by means of proper journals at the two extremities of said bar, is the frame H, in which is mounted the cylindrical recipient and planter K, in such manner that the same will revolve by contact with the ground, whenever the machine is in actual use.

The articulation of the frame H, that results from its pivot-connection with the cross-bar E, effects a ready adaptation of the recipient and planter K to any inequalities or irregularities in the surface of the ground over which it passes.

This recipient and planter of the seed is provided with a hinged section, I, at one point of its circumference, which serves as a door or opening through which the seed is introduced.

The clasp $g$ and staple $h$, or any equivalent device, secures this section I in a closed position, and also presents a quick means of opening the same whenever the recipient is to be filled or replenished with seed.

At such intervals apart as it is desired to plant the cotton-seed, the shell of the cylinder K is perforated with round holes, $i$, for depositing or planting the seed in the ground.

To control the deposition through these apertures, each one of them is provided with a means through which it can be partially or wholly closed. These means consist of thin plates, $m$, secured on the inner surface of the perimeter or shell of the cylinder, by means of pivot-pins $n$, (see fig. 2, on which they can be moved, so as to shut partially or wholly, or open the said aperture.

Still further to subserve the same purpose, and prevent the crowding of the seed through the apertures, or the choking of the latter, blocks O are placed over them, in such manner as not to interfere with the operation of the covering-plates $m$, which, being provided with apertures $p$, that are placed in precise line with the holes $i$, have the effect of extending the length of the same, and thus of preventing an accumulation and packing of the seed at and around the points of their escape, as well as the too profuse delivery of them.

A number of cylinders K may be provided, of different sizes, and punctured with delivering-apertures, at varying distances apart, so as to reduce or increase the distance of the hills from each other, in order to suit soils of different degrees of fertility, or the notions of different planters in this regard, &c.

A chain or cord, S, being secured to the rear crossbar of the frame H, in connection with hooks s s in the handles, affords the means of elevating the cylinder K off the ground when it is not in use, and thus of preventing the same from revolving and planting at such times, notwithstanding the machine may be in motion, and the delivering-apertures i unclosed.

This chain-link or cord S, (for it may be either,) affords, also, a means for preventing the precipitation of the cylinder into ditches or the like, when the machine is lifted over the same, and any consequent disarrangement of the parts which might result from such accident.

Connected to the frame H, by any proper flexible straps or means, R, in such manner as to follow just in the rear of said frame, is a transverse loose covering-bar or drag, W, which performs the office of covering the seed in an effectual and thorough manner.

The operation of my machine has been sufficiently indicated in describing it, and I need, therefore, only say further, that it has been thoroughly tested, and proved to be capable of fulfilling the objects for which it is designed in a far better manner than any cotton-planter of which I have any knowledge.

Having thus described my invention,

What I claim, and desire to secure by Letters Patent, is—

The combination of the plow F F' F'', when provided with the scraper-wings or blades G G', with a cylindrical seed recipient and planter, K, and covering-drag W, when all these parts are constructed and arranged relatively to each other, and operate substantially as herein described, for the purpose set forth.

A. W. BRIAN.

Witnesses:
  C. C. LEGETT,
  JAMES P. PARTIS.